Dec. 2, 1952 W. SWIFT 2,620,139
MACHINE FOR WINDING ARMATURES
Filed Jan. 3, 1950 8 Sheets-Sheet 1

Inventor
W. Swift

Dec. 2, 1952 W. SWIFT 2,620,139
MACHINE FOR WINDING ARMATURES
Filed Jan. 3, 1950 8 Sheets-Sheet 4

Inventor
W Swift

Dec. 2, 1952 W. SWIFT 2,620,139
MACHINE FOR WINDING ARMATURES
Filed Jan. 3, 1950 8 Sheets-Sheet 5

Inventor
W. Swift
By Attys.

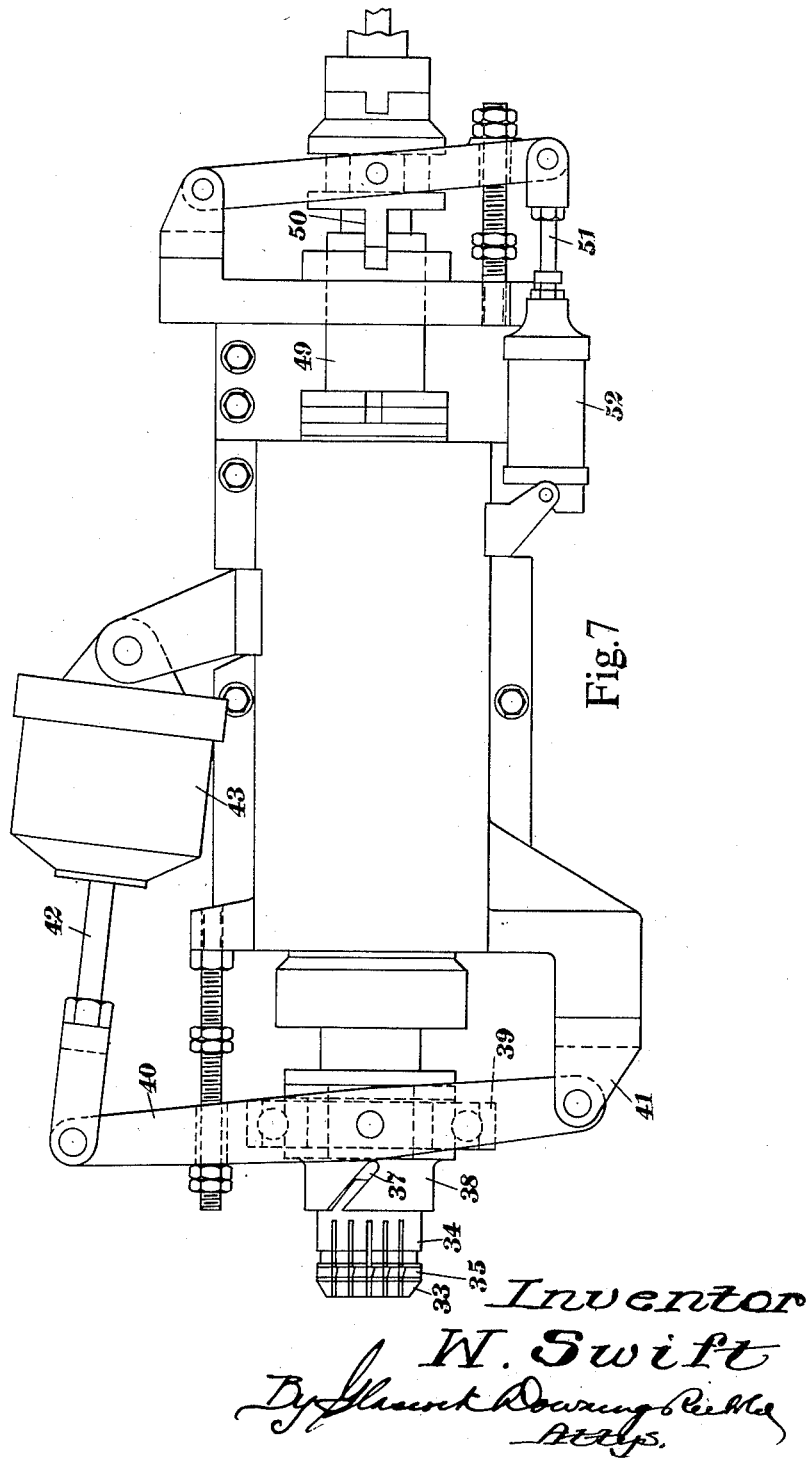

Dec. 2, 1952          W. SWIFT          2,620,139

MACHINE FOR WINDING ARMATURES

Filed Jan. 3, 1950          8 Sheets-Sheet 7

Inventor
W. Swift

Inventor
W. Swift

Patented Dec. 2, 1952

2,620,139

UNITED STATES PATENT OFFICE 2,620,139

MACHINE FOR WINDING ARMATURES

William Swift, Sutton Coldfield, England, assignor to Joseph Lucas Limited, Birmingham, England Application January 3, 1950, Serial No. 136,502
In Great Britain January 13, 1949

4 Claims. (Cl. 242—13)

This invention has for its object to provide an improved machine for winding electric dynamo, motor and like armatures, the machine being of the kind adapted to impart reciprocatory and angular movements to an armature relatively to a plurality of feed guides for laying the wires in longitudinal slots in the armature.

The invention comprises the combination of a two-part headstock, a cam mechanism for imparting reciprocatory movements to the headstock, fluid-operated means for reciprocating one part of the headstock relatively to the other, a hollow spindle carried by the headstock, a rack and pinion mechanism for imparting angular movements to the spindle, a cam mechanism for reciprocating the rack, a first motion shaft, a clutch for connecting this shaft to its source of motion, a second clutch on the said shaft by which motion is transmitted (through intermediate gearing) to the said cam mechanisms, valves for controlling the said and other fluid operated means employed in the machine and cams on a shaft driven from the first motion shaft for controlling the valves and clutches.

The invention also comprises the combination with the hollow spindle, of a collet for gripping one end of the spindle of the armature to be wound, and fluid operated means for actuating the collet.

Further, the invention comprises the combination of an annular arrangement of wire guides corresponding in number to the slots in the armature to be wound, radial stems carrying the wire guides, an angularly movable member adapted to impart radial movements to the said stems, and fluid operated means for actuating the said member.

Moreover, the invention comprises the combination with the spindle and the cam which reciprocates the headstock, of fluid operated clutches as and for the purpose hereinafter described.

In the accompanying drawings:

Figure 7 is a plan of a portion of the mechanism associated with the headstock for actuating the wire gripping and cutting tools.

Figure 1:
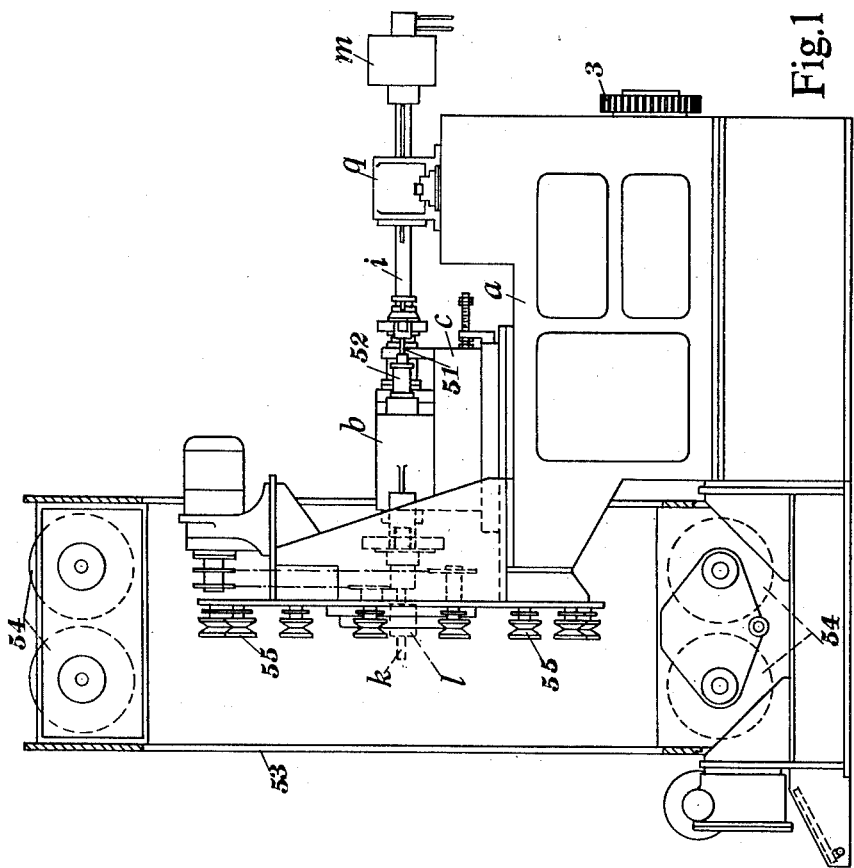
Figure 1 is a side elevation and Figure 2 a front elevation illustrating the general arrangement of an armature winding machine embodying the invention.

Referring to the drawings, there is mounted on a horizontal bed $a$, a headstock comprising upper and lower parts $b$, $c$. The lower part $c$ is slidably supported on the bed, and the upper part $b$ is slidably supported on the lower part $c$. For reciprocating the headstock as a whole, a cam $d$ (Fig. 3) is provided on a shaft $e$ within the bed, the cam having in its periphery a suitably shaped groove which is engaged by a peg or roller $f$ extending from the underside of the lower part $c$ of the headstock. For reciprocating the upper part of the headstock relatively to the lower part, there are provided within the headstock, a cylinder $g$ and plunger $h$ respectively connected to the headstock parts and operable by compressed air (or other motive fluid).

Extending horizontally through the upper part of the headstock is arranged a hollow spindle $i$ which at one end is provided with a collet $j$ for gripping one end of the spindle $k$ (Figure 1) of the armature $l$ to be wound, and at the opposite end of the spindle is mounted a cylinder $m$ containing a piston $n$ by which the collet $j$ can be actuated through a rod $o$ in the spindle $i$, the piston being operated by compressed air (or other fluid). The collet $j$ is formed on or secured to one end of the rod $o$, and the corresponding end of the hollow spindle $i$ is shaped to contract the collet when the rod is moved to the right in Figure 3. For imparting the required angular movements to the spindle $i$, a pinion $p$ is mounted on and in spline connection with the spindle, the pinion being mounted in a housing $q$, and in engagement with the pinion is provided a reciprocatory rack $r$ arranged transversely to the spindle. The rack is actuated by a cam $s$ having in its periphery a suitably shaped groove engaged by a roller or peg $t$ extending from the underside of the rack, the cam $s$ being mounted on a shaft $u$.

Figure 4:
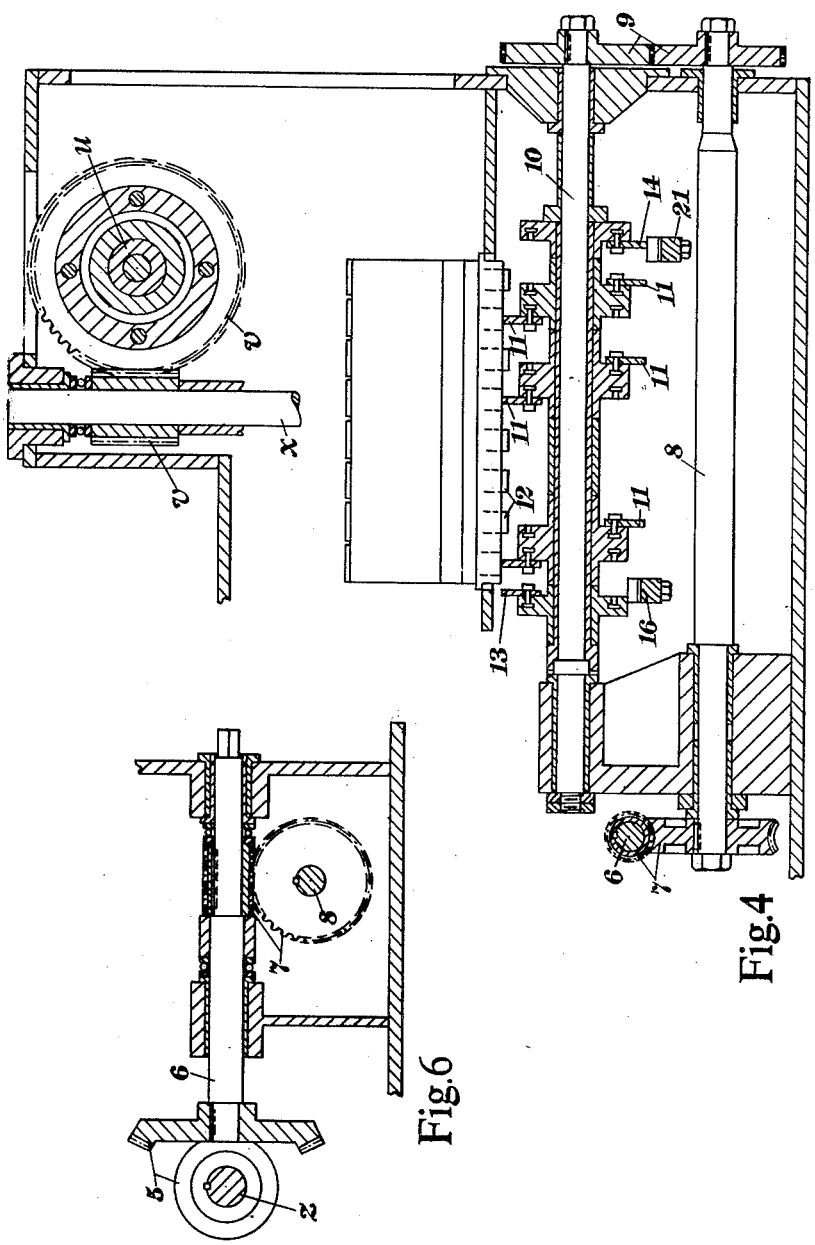
Figure 4 is a side elevation of a portion of the headstock actuating mechanism.

The shafts $e$, $u$ carrying the two cams $d$, $s$ above mentioned are connected through worm gearing $v$, $w$, an intermediate shaft $x$ and bevel pinions $y$, to a first motion shaft $z$, the bevel pinion of this shaft being engageable with the shaft $z$ through a clutch $2$ which is controlled as hereinafter described. The first motion shaft $z$ is connected through suitable gearing (as $3$) to the source of motion (which is conveniently an electric motor) by means of a clutch 4 which is controlled by the attendant and by automatic means as hereinafter described. From the first motion shaft z, motion is taken through gearing 5 and an intermediate shaft 6, worm gearing 7, a countershaft 8 and gearing 9 (Figure 4) to a cam shaft 10 carrying a number of cams as 11 for controlling an assembly of valves 12 associated with the above mentioned fluid operated mechanisms, as well as others to be hereinafter mentioned. Other cams 13, 14 on the cam shaft 10 serve to operate the control means of the two clutches 2, 4 on the first motion shaft.

Figures 5, 9:
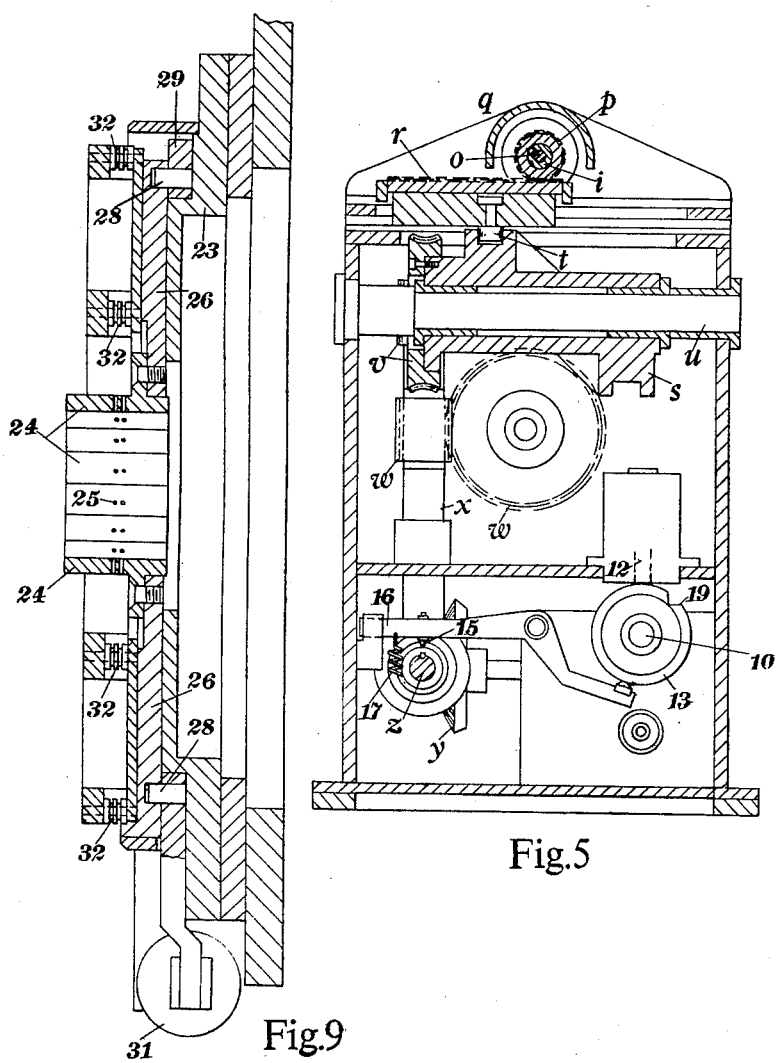
Figure 5 is a sectional end view, Figure 6 being a sectional end view of a portion of the said mechanism.
Figures 8 and 9 are respectively sectional front and side elevations of the wire guides.

The slidable member of the clutch 2 has formed around its periphery a groove having a helical or cam shaped side face which can be engaged by a peg 15 on a lever 16 which is loaded by a spring 17 (Figure 5), and one end of this lever co-operates with the cam 13 on the shaft 10. So long as the lever is in contact with the periphery of this cam the peg is held clear of the groove and the clutch parts are interengaged by a spring 18. But when a notch 19 in the cam comes adjacent to the lever, the peg engages the clutch groove under the action of the spring 17, and the interaction of the peg and cam face of the said groove causes the clutch parts to be separated for disconnecting the shaft x from the first shaft z, and thereby arresting the action of the cams d, s. This occurs once in each complete cycle of action of the machine.

The slidable member of the clutch 4 is also formed with a peripheral groove, having one of its faces shaped to a helical or cam like form. This groove is engageable by a peg 20 on a lever 21 which is spring loaded. This lever is similar to the lever 16 and is similarly actuated by the cam 14. In addition the lever 21 is independently operable by the attendant for disengagement to enable the spring 22 to bring the clutch into action. To start the machine at the commencement of each cycle of action, the attendant raises the lever 21 by any convenient means (not shown). The spring 22 then moves the slidable clutch member into engagement with its complementary member, so setting the machine in motion. During the subsequent action of the machine the lever 21 is held out of action by the associated cam 14. At the end of the cycle the cam releases the lever and allows it to re-engage the slidable clutch member for disengaging the clutch and stopping the machine when the cycle is completed. In the initial part of the cycle, the cam 13 disengages the peg 15 of the lever 16 from its associated slidable clutch member to enable the clutch 2 to come into action. In each complete cycle the cam 13 operates to disengage clutch 2 after the appropriate number of turns have been wound on the armature, and cam 14 stops the machine when the cycle is completed.

At the position occupied by the armature l to be wound, there is mounted a stationary annular housing 23 (Fig. 9) carrying the feed guides for the wires to be laid in the armature slots. Each wire guide consists of a short bar 24 arranged parallel with and closely adjacent to the peripheral surface of the armature l (Figure 1). When (as in the example at present being described) it is required to feed two wires simultaneously to each slot, two suitably spaced holes 25 are formed in the guide. The number of guides employed corresponds with the number of slots in the armature, and the guides are equispaced around the armature. The length of each guide is such that during the winding operation the laid wires are prevented by the guides from being pulled out of the armature slots.

From each guide, a stem 26 extends radially outwards, and near the outer end of each stem there is formed on one of its side faces an oblique groove 27 which is engaged by a peg 28 extending from one face of a ring 29 carried on the housing 23. This ring is movable through a convenient angular distance by an air (or other fluid) operated plunger 30 in a cylinder 31 mounted adjacent to the housing, for imparting inward or outward radial movements to the wire guides. For suitably adjusting the tension of the wires approaching the guides, pairs of adjustable jockey rollers 32 are provided at a convenient distance apart in contact with the wires.

The tools required to grip the wires, and to sever them at the completion of a winding operation, are of any convenient form and are mounted on the end of the hollow spindle i which carries the armature. Preferably the tools are constructed as described in the specification of Patent No. 2,536,582 and comprise three main parts 33, 34, 35 (Figs. 3 and 7) formed with peripheral grooves for receiving the wires.

The part 33 includes a sleeve 36 adapted to be mounted on the forward end of the spindle i.

The part 34 comprises another sleeve mounted on the part 33. The part 35 consists of a ring having a lost motion connection with both parts 33, 34. The required angular movements of the second and third parts relatively to each other and to the first sleeve, for gripping the wires laid in the grooves and eventually severing them (as described in the above mentioned specification of Patent No. 2,536,582), is effected by means of a pair of obliquely disposed projections 37 on the part 34 which engage slots in a surrounding slidable member 38, the latter being operable by an annular member 39. This annular member is movable axially in any convenient manner for imparting the required angular movements through the said projections to the sleeves, but preferably it is moved by a yoke-like arm 40 hinged at one side to a bracket 41 (Figure 7) on the headstock and at the other end it is movable by a plunger 42 in a cylinder 43 carried on the headstock, the plunger being operable by air or other fluid. The arrangement is such that a given angular movement of the sleeve 34 relatively to the ring 35 serves to grip the wires laid in the grooves in these parts, and a further angular movement causes the ring 35 to move relatively to the part 33 for severing the wires.

For some purposes it is desired to be able to arrest temporarily (during the winding operation) the action of the cams d, s on the headstock and spindle. For this purpose, the cam d acting on the headstock is connected to its shaft through a clutch 44 which is operable by an air (or other fluid) operated plunger 45 in a cylinder 46 for locking the cam either to its shaft or to an adjacent fixed part of the machine. The plunger 45 acts on the clutch through a lever 47 having a detent 48 the latter being engaged with the part of the clutch on the cam, when the other clutch part is disengaged. Also the hollow spindle i is formed by two parts, one of which carries the pinion p and collet j and the other 49 (which is mounted around the first) carries the wire gripping and severing tools. By means of a slidable clutch 50 operated by the air (or other fluid) operated plunger 51 in a cylinder 52 (Figure 7), the shaft part 49 can be connected to the part $i$ or locked to the headstock. Thus, the slidable part of the clutch 50 serves in one extreme position (as shown) to connect the spindle part 49 to the spindle part $i$, and in the other extreme position to connect the part 49 to the headstock part $b$. The action of the clutches 44, 50 is controlled by additional cams (not shown) on the cam shaft 10 above described.

Figure 2:
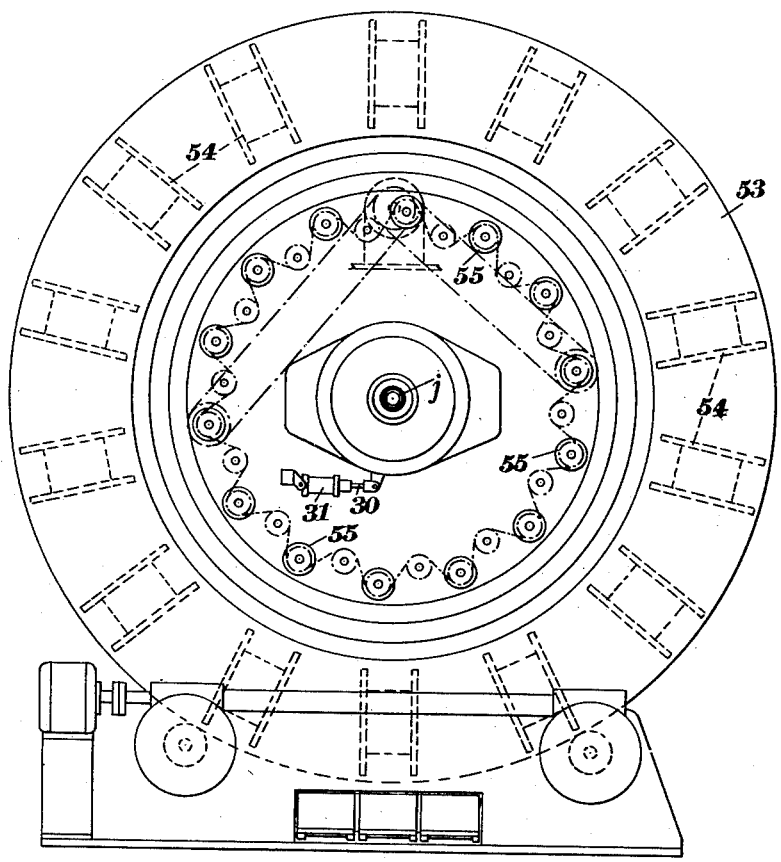

So far as my invention is concerned, the foregoing description includes all the main parts relevant to the invention, but to complete the machine, appropriate means are required for carrying the wire stock and feeding the wires to the guides. In one arrangement I may employ an annular frame 53 (Figures 1–2), which is rotatable for convenience in loading, and which is constructed to provide a series of radial compartments in each of which two coils of wire 54 can be rotatably mounted. Within the frame are arranged an annular system of driven feed rollers 55 which grip the wires and feed them at an appropriate rate to the guides which are located at the center of the frame.

Figure 3:
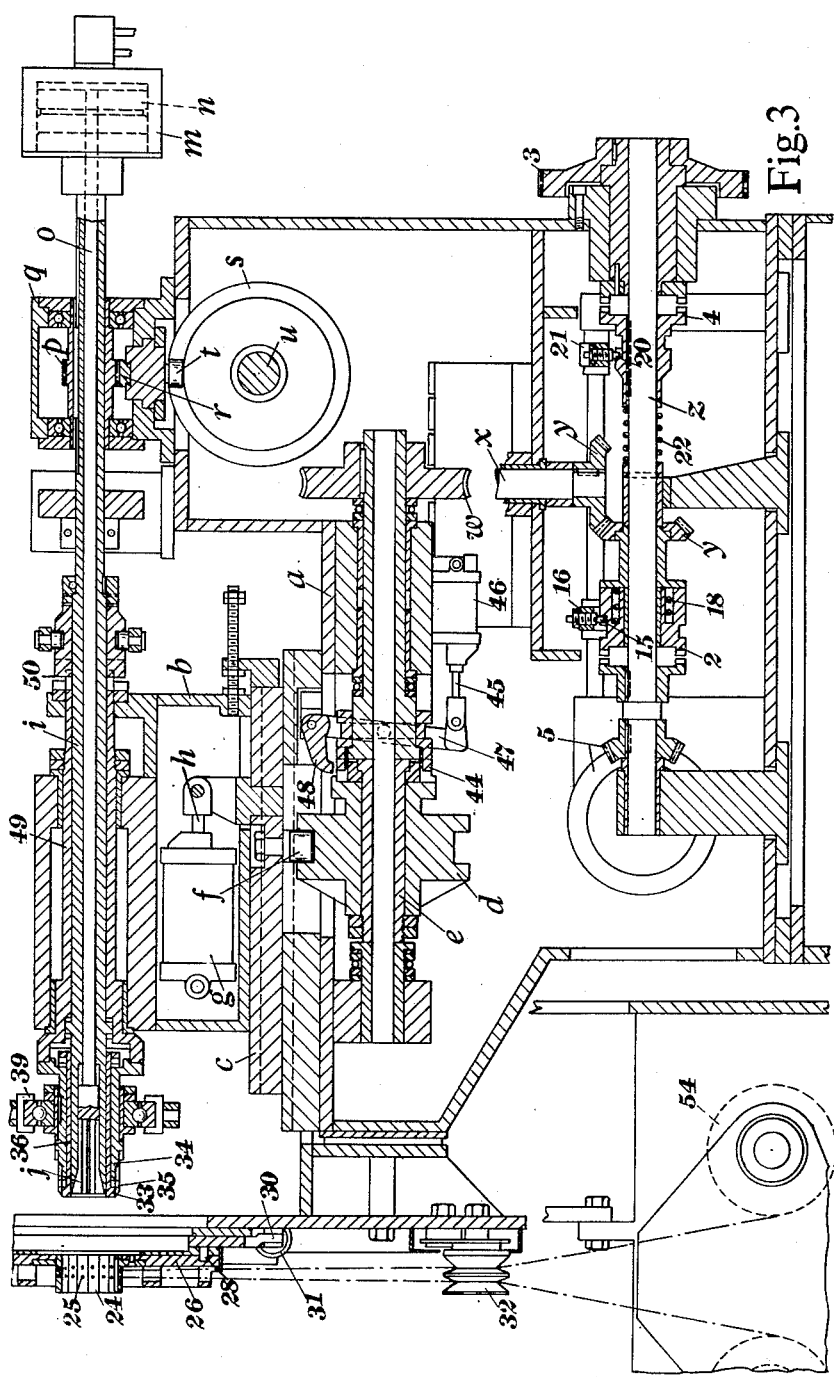
Figure 3 is a sectional side elevation (to a larger scale than Figures 1 and 2) of the two-part headstock and associated actuating mechanism.
Figure 8:
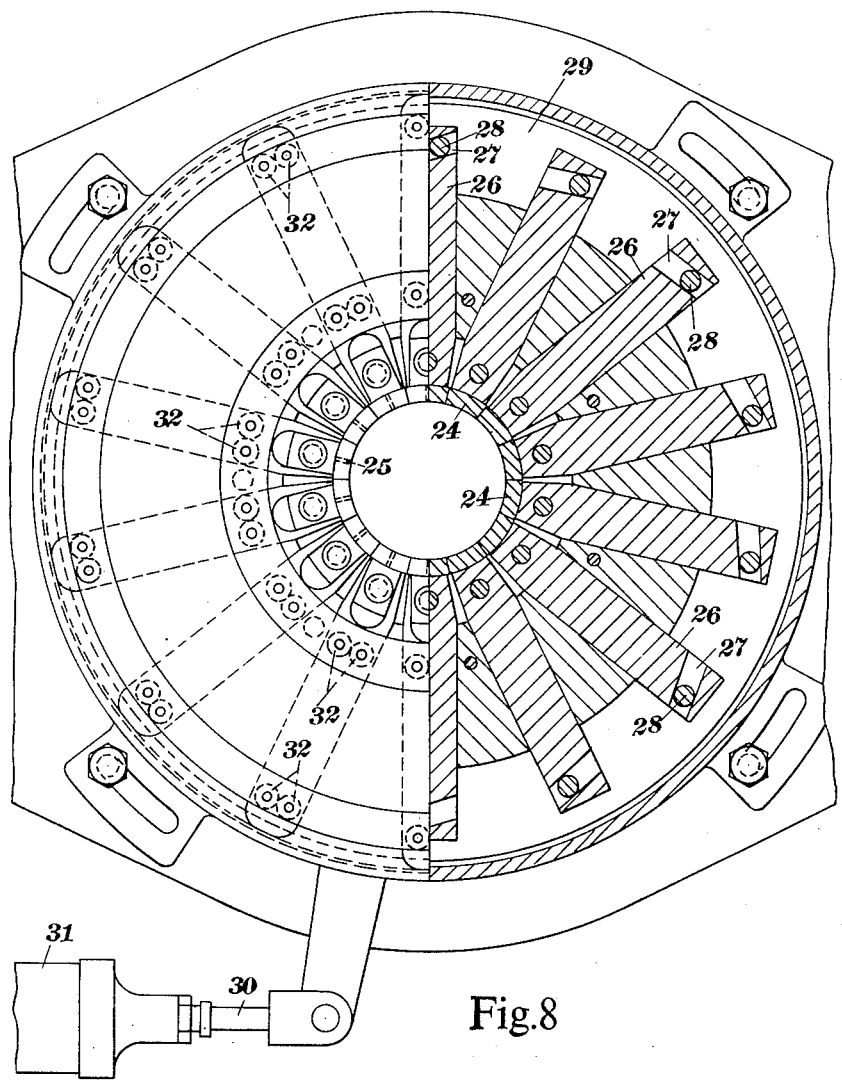
Figure 10:
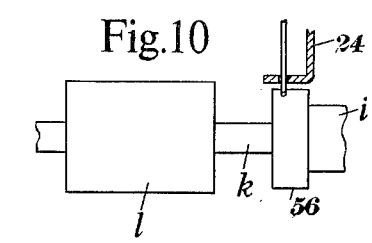
Figures 10 to 18 are diagrams illustrating the mode of winding an armature by a machine shown in Figures 1–9.
Figure 11:
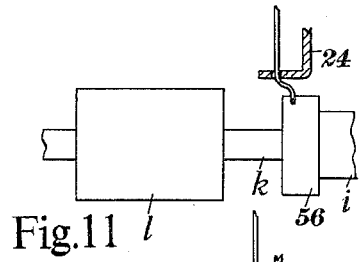
Figure 12:
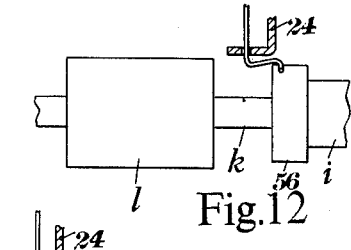
Figure 13:
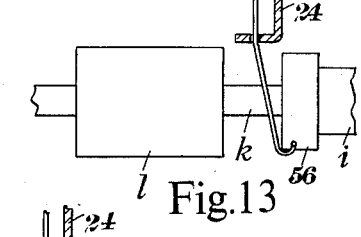
Figure 14:
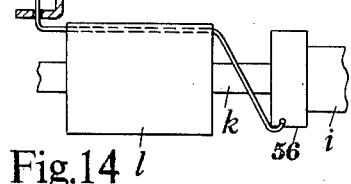
Figure 15:
Figure 16:
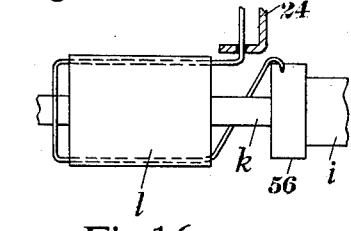
Figure 17:
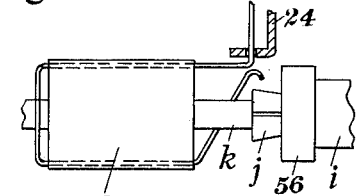
Figure 18:
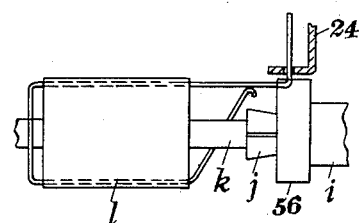

The method of winding an armature by the machine above described will now be described with reference to the diagrams shown in Figures 10–18. To facilitate description it will be assumed that it is required to wind a single wire around one opposite pair of longitudinal slots in the armature. Assuming an armature has already been wound, and has been replaced by an armature to be wound, and that the operator has started the machine by raising the lever 21 as above described, the armature $l$, wire guide 24 and wire and gripping tools (indicated generically by 56 and corresponding to the above mentioned tools 33, 34, 35) occupy the relative positions shown in Figure 10. The spindle $i$ carrying the tools and armature are then moved to the right by movement of the headstock part $b$, and the guide 24 is temporarily retracted as shown in Figure 11 by angular movement of the ring 29 (Fig. 8) to allow the wire to fold over the forward end of the tool so that when the guide is returned to its normal position the wire is in the condition shown in Figure 12. At this stage the spindle is rotated through approximately 180° to the position shown in Figure 13 by movement of the rack $r$ (Figure 3). Then by joint movement of the headstock parts $b$, $c$ the spindle is moved still further to the right causing the wire to be laid along one of the armature slots as shown in Fig. 14. A further angular movement of the spindle in the same direction through approximately 180° by the rack $r$ brings the armature to the position shown in Figure 15. The spindle is then moved to the left as shown in Figure 16, causing the wire to be laid along the opposite slot of the armature. The sequence of operations consisting of alternate linear and angular movements of the spindle, is repeated until the desired number of turns of wire have been laid in the armature slots. But for simplicity of explanation it will be assumed that the winding has been completed when the parts are in the condition shown in Figure 16. At this stage the previously gripped end of the wire is now released by relative angular movement of the tool parts and the collet $j$ in the tool-carrying spindle is moved to the left causing the armature to be moved relatively to the tool spindle and the previously gripped end of the wire to be extracted from the tools as shown in Figure 17. The upper part of the headstock is now moved to the left relatively to the lower part, to bring the tools and armature to the position shown in Figure 18, causing a portion of the wire to enter the adjacent groove in the tools. Relative angular movement of the tool parts now causes the wire to be severed, leaving a portion of the wire gripped by the tools. After removing the armature from the machine it is replaced by another and the next cycle is commenced as shown in Figure 10. Successive cycles are repeated until the whole of the wire on the stock reels has been exhausted. When these are replaced by other stock reels, the free ends of the wires are first fed through the guides, and to enable these ends to be conveniently gripped by the tools the guides are temporarily retracted. It will be understood that whereas in the foregoing a description has been given of the laying of wires in one opposite pair of armature slots, wires are laid simultaneously in all of the armature slots.

In the example above described the tool spindle, $i$, 49 is oscillated by the cam $s$ through 360° in two stages of 180° each. Consequently, alternate windings extend across opposite sides of the armature spindle. This is an advantageous condition, but it is also desirable that the direction of movement of the tool spindle at the commencement of each winding operation on an armature shall be always in the same direction. This will be the case if it is required to lay an even number of turns in the armature slots, and the clutches 44 and 50 will then remain in their operative positions in which the tool spindle parts $i$, 49 are connected together and the cam $d$ is connected to the shaft $e$. If, however, it is required to lay an odd number of turns in the armature slots, then when the winding of one armature is completed the clutches 44 and 50 are moved to their other positions for holding the spindle part 49 and the cam $d$ stationary while the cam $s$ makes an idle movement through 360° into its initial position.

In some winding operations the tool spindle is oscillated through 180° only, in which case the clutches 44 and 50 may be either retained in their operative positions or dispensed with altogether.

By this invention the winding of armatures can be effected in a very simple and expeditious manner.

Having thus described my invention what I claim as new and desire to secure by Letters Patent is:

1. For use in the winding of armatures, a machine comprising the combination of a two-part headstock, a cam mechanism for imparting reciprocatory movement to the headstock, a hollow spindle carried by one part of the headstock, fluid-operated means for reciprocating the headstock part carrying the spindle relatively to the other headstock part, a rack and pinion mechanism for imparting angular movements to the spindle, a cam mechanism for reciprocating the rack, a first motion shaft, a clutch through which motion is transmissible to the shaft, a second clutch on the shaft, gearing through which motion is transmissible to both of the cam mechanisms from the shaft under the control of the second clutch, valve means for controlling the fluid-operated means, a second shaft rotatable by the first motion shaft, and cams on the second shaft for controlling the valve means and clutches.

2. A machine as and for the purpose claimed in claim 1, and having combined with the hollow spindle, a collet for gripping one end of the spindle of the armature to be wound, and fluid operated means for actuating the collet.

3. A machine as and for the purpose claimed in claim 1, and having combined therewith an annular arrangement of wire guides corresponding in number to the slots in the armature to be wound, radial stems carrying the wire guides, an angularly movable member adapted to impart radial movements to the said stems, and fluid operated means for actuating the said member.

4. For use in the winding of armatures, a machine comprising the combination of a headstock composed of two parts, a cam mechanism for imparting reciprocatory movements to the headstock, a hollow spindle composed of two parts and carried by one of the headstock parts, fluid-operated means for reciprocating the headstock part carrying the spindle relatively to the other headstock part, a rack and pinion mechanism for imparting angular movements to the spindle, a cam mechanism for reciprocating the rack, a first motion shaft, a clutch through which motion is transmissible to the shaft, a second clutch on the shaft, gearing through which motion is transmissible to both of the cam mechanisms from the shaft under the control of the second clutch, valve means for controlling the fluid-operated means, a second shaft rotatable by the first motion shaft, cams on the second shaft for controlling the valve means and clutches, a third clutch which in one position serves to interconnect the two parts of the spindle, and in another position serves to secure one of the spindle parts to the headstock part carrying the spindle, a fourth clutch which in one position renders the cam mechanism operative, and in another position renders the cam mechanism inoperative, additional fluid-operated means for actuating the third and fourth clutches, additional valve means for controlling the additional fluid-operated means, and additional cams on the second shaft for controlling the additional valve means.

WILLIAM SWIFT.

REFERENCES CITED

The following references are of record in the file of this patent:

UNITED STATES PATENTS

| Number | Name | Date |
|---|---|---|
| 2,381,750 | Hunsdorf | Aug. 7, 1945 |

FOREIGN PATENTS

| Number | Country | Date |
|---|---|---|
| 620,019 | Great Britain | Mar. 17, 1949 |

OTHER REFERENCES

Automatic Armature Winding in Less Than One Minute, Electrical Manufacturing, June 1947.